(12) United States Patent
Josse et al.

(10) Patent No.: US 9,272,935 B2
(45) Date of Patent: Mar. 1, 2016

(54) TREATMENT OF WASTE PRODUCTS WITH ANAEROBIC DIGESTION

(75) Inventors: Juan Carlos Josse, Mission Viejo, CA (US); Andrew Benedek, Rancho Santa Fe, CA (US)

(73) Assignee: Anaergia Inc., Burlington (CA)

( * ) Notice: Subject to any disclaimer, the term of this patent is extended or adjusted under 35 U.S.C. 154(b) by 0 days.

(21) Appl. No.: 13/982,598

(22) PCT Filed: Nov. 22, 2011

(86) PCT No.: PCT/CA2011/050726
§ 371 (c)(1),
(2), (4) Date: Oct. 11, 2013

(87) PCT Pub. No.: WO2012/103629
PCT Pub. Date: Aug. 9, 2012

(65) Prior Publication Data
US 2014/0034574 A1    Feb. 6, 2014

Related U.S. Application Data

(60) Provisional application No. 61/439,068, filed on Feb. 3, 2011, provisional application No. 61/452,956, filed on Mar. 15, 2011, provisional application No. 61/522,870, filed on Aug. 12, 2011, provisional application No. 61/524,590, filed on Aug. 17, 2011.

(30) Foreign Application Priority Data

Aug. 12, 2011    (CA) .................. PCT/CA2011/050498
Aug. 24, 2011    (CA) ..................................... 2750392

(51) Int. Cl.
C02F 11/04        (2006.01)
C02F 103/20      (2006.01)
(Continued)

(52) U.S. Cl.
CPC ............. *C02F 11/04* (2013.01); *C02F 2103/20* (2013.01); *C02F 2103/22* (2013.01); *C02F 2103/32* (2013.01); *C02F 2303/24* (2013.01); *Y02W 10/23* (2015.05)

(58) Field of Classification Search
None
See application file for complete search history.

(56) References Cited

U.S. PATENT DOCUMENTS 7,641,796 B2    1/2010    Stroot et al.
2003/0266703    11/2006    Stroot et al.
(Continued)

FOREIGN PATENT DOCUMENTS

CA    2641270           12/2009
KR        872358 B1  * 12/2008
WO    2010094115         8/2010

OTHER PUBLICATIONS

Sieger, et al., "White Paper on High Performance Anaerobic Digestion," Jan. 2004.*
(Continued)

*Primary Examiner* — Chester Barry
(74) *Attorney, Agent, or Firm* — Borden Ladner Gervais LLP

(57) ABSTRACT

A waste stream is treated by anaerobic digestion. A process is described involves a step of separating solids from digestate, and returning separated solids to a digester. Optionally, there may be a step of solids separation in which larger solids are removed from the digester. A process and apparatus are described for treating waste sludge from a wastewater treatment plant in an anaerobic digester. Feed sludge is thickened or solids are separated from digestate and returned to the digester. Additional co-digestion waste may be added to the digester. The process and apparatus may be used in a retrofit of an existing wastewater treatment plant.

14 Claims, 3 Drawing Sheets

(51) Int. Cl.
    *C02F 103/22*     (2006.01)
    *C02F 103/32*     (2006.01)

(56) References Cited

U.S. PATENT DOCUMENTS

2009/0186136 A1* 7/2009 Lindeboom et al. .......... 426/430
2009/0209025 A1* 8/2009 Goschl et al. .............. 435/262.5
2010/0021979 A1* 1/2010 Facey et al. ................... 435/147
2012/0145627 A1* 6/2012 Benedek ....................... 210/601
2014/0166555 A1* 6/2014 Dibel et al. ..................... 210/87

OTHER PUBLICATIONS

"Central Kitsap County Wastewater Treatment Plant Alternatives Development Workshop," Brown & Caldwell, Oct. 28, 2008.*
Copy of International Search Report of PCT/CA2001/050726.

* cited by examiner

TREATMENT OF WASTE PRODUCTS WITH ANAEROBIC DIGESTION

FIELD

This specification relates to a process or apparatus for treating waste products, such as waste sludge from wastewater treatment or agricultural or industrial wastes, involving anaerobic digestion.

BACKGROUND

A biogas may be produced through the anaerobic digestion of a material containing biomass. The biogas is typically comprised of 50-75% methane and 25-50% carbon dioxide. Other gases, such as nitrogen, hydrogen, hydrogen sulfide or oxygen may be also present but collectively are unlikely to account for more than 10% of the biogas. Of these other gases, nitrogen is likely to be the largest component. The biogas can be burned directly with oxygen, for example, and so is usable as a fuel. The methane within the biogas can also be concentrated to provide a replacement for natural gas.

Biogas can be produced in an anaerobic digester. The digestion process involves microorganisms, primarily bacteria, which break down or convert the input materials to produce the biogas and an effluent. The process involves a series of bacteria types and processes, primarily hydrolysis, acidogenesis, acetogenesis and methanogenesis.

Anaerobic digesters were originally designed primarily for use with cattle manure and sludges. The sludge may be, for example, waste sludge from a municipal wastewater treatment plant. Municipal wastewater, or sewage, is typically treated using an activated sludge process with primary clarification, a biological process train, and secondary clarification. Waste activated sludge, optionally thickened, and primary sludge may be fed to an anaerobic digester at a dry solids (DS) concentration of up to about 4%. The digester typically operates at 2 to 2.5% solids concentration in the digester with a 20 to 25 day hydraulic retention time (HRT).

SUMMARY

This section is intended to introduce the reader to the more detailed disclosure that follows, and not to limit or define any claimed or disclosed invention. One or more inventions may reside in a combination or sub-combination of one or more apparatus elements or process steps described in this document.

Processes and apparatus will be described in this specification for treating a waste involving anaerobic digestion. The waste may be, for example, an agricultural or industrial waste, or a waste sludge from a wastewater treatment plant. The process involves a step of separating solids from digestate, and returning separated solids to a digester. Optionally, there may be a step of solids separation in which larger solids are removed from the digester.

A process and apparatus will be described in this specification for treating waste sludge from a wastewater treatment plant. The waste sludge is treated in an anaerobic digester. Feed sludge is thickened or solids are separated from digestate and returned to the digester. Additional co-digestion waste may be added to the digester. The process and apparatus may be used in a retrofit of an existing wastewater treatment plant.

DRAWINGS

DETAILED DESCRIPTION

Figure 1:
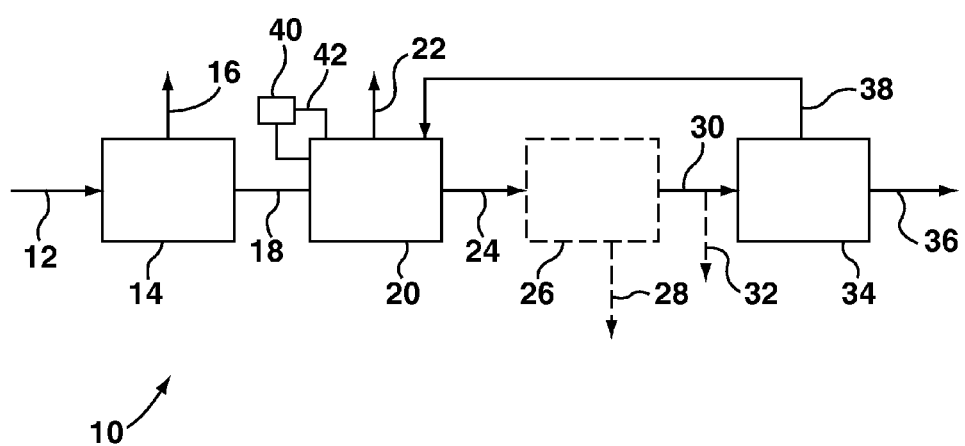
FIG. 1 is a schematic flow sheet of an anaerobic digestion system.

FIG. 1 shows a plant 10 for treating a feed liquid 12 containing organic matter. The feed liquid 12 may be a single stream or a composite, whether mixed or not, of two or more waste streams. The feed liquid 12 may have a low solids content, for example a total solids (TS) concentration of 6% or less or 4% or less, measured on a dried solids (DS) basis. The feed liquid 12 may be pre-separated to remove contaminants such as plastic, glass, metals or other undigestible solids. As examples of feed liquids, wastewater from a slaughter house or food processing plant may have a TS concentration of 1-2%. Pig manure may have a TS concentration of 2-3%. Waste sludge from a wastewater treatment plant using an activated sludge process may have a TS concentration of 1-4%.

The feed liquid 12 optionally flows into an upstream thickener 14. The upstream thickener 14 is a solid—liquid separation device such as a clarifier, sedimentation basin, flotation device, press or filter, or a combination of one or more of these or other devices. The first thickener 14 produces a first thickener effluent 16. The first thickener effluent 16 is primarily water, with a TS concentration typically of 2% or less, that may be treated for example as municipal waste water. The upstream thickener also produces, as a retained portion, a thickened feed liquid 18. The thickened feed liquid may have a TS concentration of, for example 6 to 12% or more.

The feed liquid 12 or thickened feed liquid 18 flows into a digester 20. The digester typically 20 comprises one or more tanks, in series or in parallel or both, with mixing apparatus. For example, the digester 20 may be a sealed tank with an internal mechanical mixer. A suitable digester 20 and mixers are available from UTS Products GmbH. The digester 20 contains microorganisms, primarily bacteria, to digest the feed liquid 12 or thickened feed liquid 18. The digester 20 may be seeded with the microorganisms, or the microorganisms may be carried into the digester 20 as a component of the feed liquid 12 or the thickened feed liquid 18. The microorganisms convert solids in the feed liquid 12 or thickened feed liquid 18 into, among other things, a biogas 22 which is collected and removed from the digester 20.

The digester 20 also produces a digestate 24. Due to the action of the microorganisms in the digester 20, the digestate 24 has a reduced TS concentration relative to the feed liquid 12 or thickened feed liquid 18, whichever is fed to the digester 20. The digestate 24 may have a TS concentration of for example 3-8%, typically 5-6%.

Optionally, the digestate 24 may pass through a separator 26. The separator 26 provides a coarse separation, for example as produced by a static screen, vibrating screen, screw press or similar equipment. A portion of the separated solids 28 from the separator 26 may be returned to the digester 20, but the separated solids 28 are preferably removed from the plant 10. The separated solids 28 are likely to have high concentrations of materials that are difficult for anaerobic bacteria to digest. The separated solids 28 may be processed further to produce useful products such as fertilizer. Although the separator 26 is shown in FIG. 1 in an effluent stream, the separator 26 may also be located in a re-circulating side stream, alone or in combination with one or more other unit process such as thickeners or other solid—liquid separation devices, a heater, or a grinder.

The separator 26 may be used without other solid—liquid separation devices operating on the feed liquid 12 or digestate 24. Preferably, the separator 26 is used in a process of selective solids recovery in combination with one or more other solid—liquid separation processes operating on the digestate 24 such as a second thickener 34 to be described below. The other solid—liquid separation device may be located downstream of the separator 26, or in a re-circulating side stream. The other solid—liquid separation device is used to retain certain solids including biomass to increase the solids retention time (SRT) of biomass in the digester 20, and biomass inventory, without increasing the hydraulic retention time (HRT) of the digester 20. The separator 26, in contrast, is used to remove less desirable solids to decrease their SRT.

When digesting some forms of waste, the feed liquid 12 may have large solid particles. This tends to be the case with high solids content feeds, and also with feeds that start with large particles but cannot be screened prior to feeding the digester 20. This is the case, for example, with fruit and vegetable processing peel waste, animal manures that contain bedding materials, silage, and other fibrous substrates. These substrates are usually fed with chopper pumps or conveyors, depending on the solids content, and usually undergo some level of grinding prior to entering the digester 20. However, the particle size usually remains large, for example 4 mm or larger. When digesting this type of substrate, a portion of the large particles are not digested even though they may be volatile in principle.

There is no advantage in retaining large particles of undigested solids in the digester 20, as there is a limit to the extent to which these particles can be anaerobically degraded, even if they contain volatile matter, in any reasonable SRT. Undigested solids tend to accumulate in a digester 20 and do not contribute significantly to biogas generation. An accumulation of undigested solids thickens the digestate 24, making mixing in the digester 20 more difficult and causing an increase in the mixing energy consumed. Solids recovery preferably extends the SRT of the biomass, but not of the undigested solids. By using two or more separate solid—liquid separation processes, two or more separate SRTs can be maintained, one for each type of solid preferentially retained or removed by the solid-liquid separation processes.

Undigested solids tend to be larger than useful biomass and this size difference may be used to remove undigested solids while retaining biomass. The separator 26 may be used to remove undigested solids without removing significant amounts of biomass. The separator 26 may use, for example, a filter screw press with an appropriate screen opening size for the particular substrate or combination of substrates being fed to the reactor 20. Suitable filter presses are manufactured by UTS Products GmbH and others. No polymer is required in the press since it is not intended to remove biomass or suspended solids that may still be digestible. Pressure generated by a scroll pushing solids against a spring or pneumatically loaded pressure plate forces liquid and suspended and colloidal solids through the screen, while larger undigested solids exit as a 20 to 30% solids cake 28. The cake 28 may be sent for composting or disposal, or for use as a bedding material or other uses.

The screen opening in the press, or the equivalent opening in another device, may be 300 microns or larger. The microbial biomass solids are much smaller in size, usually smaller than 5 microns, and they are pushed out with the liquid through the screen by the pressure developed inside the press.

The separator effluent 30 flowing out of the filter screw press may contain from 1 to 4% total suspended solids (TSS), comprising bacteria, smaller undigested solids and possibly inert fines.

The digestate 24 may pass through a grinder, for example in a side stream loop or upstream of the separator 26, to grind large volatile solids particles into a practically digestible size. This can reduce the amount of solids that are considered undigestible and removed in the separator 26.

The separator effluent 30 may go to a second stage of solids separation, as will be described below, or may be returned to the digester 20. Preferably, a portion 32 of the separator effluent 30 is also wasted to a dewatering device to avoid an accumulation of small inert particles, such as silt, and of biomass. Additionally or alternatively, a portion of a thickened solids stream, such as sludge 38 (to be described below) from the second thickener 34, can be wasted to a dewatering device; or digestate 24 can be wasted directly from the digester 20 to a dewatering device. Solids from the de-watering device can be sent, for example, for composting or land application as allowed. De-watering liquid can be treated as municipal wastewater.

If the digester 20 is co-located with a wastewater treatment plant, then any liquids to be treated as municipal wastewater may be sent to the head of the wastewater treatment plant.

Separator effluent 30, or digestate 24 if there is no separator 28, flows to the second thickener 34. The second thickener 34 has a smaller separation size than the separator 26. For example, the second thickener 34 may be a filter with a screen or mesh having an opening size in the range of about 10-200 microns or smaller. The second thickener 34 may be a drum filter, disc filter or similar equipment. The second thickener 34 produces a sludge 38 with an elevated solids content, for example a TS concentration of up to 10% or more. The TS concentration of the sludge 38 is more than the TS concentration of the digestate 24. A significant portion, or example 50% or more up to 100%, of the sludge 38 is preferably recycled to the digester 20. The recycled sludge 38 increases the SRT of the digester and its operating TS concentration, which is the TS concentration of the digestate 124 when the digester is a continuously stirred tank reactor (CSTR).

The second thickener 34 may be used without an upstream separator 26 when the suspended solids in the feed 12 tends to have a small particle size, usually under 3 mm, which are degradable in varying degrees. This is often the case for digesters 20 that are fed with waste sludge from a municipal waste water treatment plant, typically with a suspended solids content of 2 to 4% total suspended solids (TSS), or industrial effluents with high soluble chemical oxygen demand (COD) content and lower TSS content.

As soluble and particulate volatile solids are digested, microbial biomass is created. This biomass includes anaerobic bacteria that grow slowly and so have low biomass yields. A biomass retention time of 25 to 30 days or more is preferred for stable and reliable operation of the digester 120. However, if the liquid fed with the solids was to remain in the digester 20 for 30 days, giving a hydraulic retention time (HRT) of 30 days, in many cases the tank volume could be excessive and not economical to construct and mix. Therefore SRT for solids in the size range including the biomass is increased relative to the HRT by retaining solids with the second thickener 34 and returning at least a portion of them to the digester 20 in sludge 38. Undigested yet readily digestible solids may be similarly retained and returned to the digester 20.

The second thickener 34 is preferably closed to inhibit ammonia and hydrogen sulfide gases from escaping to control odors. Various solids separation devices can be used for the second thickener 34. The selection may depend on the suspended solids content in the digester 20 and on the undigested matter particle size.

For digestate 24 with a solids content of up to 2 or 2.5% TSS, there are various solids separation options. Firstly, tubular cross flow membranes can be used without the need for polymer. Attempting to filter solids content significantly more than 2.5% with tubular membranes would greatly reduce the membrane flux and an extremely large membrane surface area would be required. Typically, the solids content of the retained solids is doubled in the concentration. The membrane therefore becomes in practice a thickener. The digestate 24 is pumped through the membranes to create trans-membrane pressure and sufficient velocity to keep a solids layer on the membrane surface from becoming thick. The thickened sludge, for example at a 4 to 5% TSS concentration, returns to the digester 20. Suspended solids capture is usually essentially 100%.

Secondly, flotation devices such as dissolved air flotation or cavitation air flotation may be used. In this case, polymer injection is used to create a floc that floats with the introduction of micro-bubbles. The floated sludge content is usually 4 to 5% TSS. The float is pumped back to the digester 120. Suspended solids capture is usually about 98%.

Thirdly, drum thickeners may be used, also using polymer to create a floc. The floc is retained in a drum screen and the retained solids are moved forward by a screw toward an outlet as they continue to thicken. Thickened solids concentrations of up to 8% are possible. Solids drop into a hopper fed pump that returns them to the digester 120. Suspended solids capture is usually over 95%.

In the three configurations above, the liquid effluent 36 from the thickening device may be an essentially final plant effluent. However, the effluent 36 may undergo further treatment if necessary for discharge to a receiving stream or sewer or for reuse. The liquid effluent may also be returned to the front end of a co-located wastewater treatment plant in the case of a municipal sludge digester. In many cases, the liquid effluent 36 can also be treated to recover ammonia from it by a chemical or biological process. Since tubular membranes remove essentially all of the suspended solids, they may be used with a downstream ammonia removal process that is not tolerant of suspended solids.

When the TSS in the digestate 24 or separator effluent 30 is higher than 2.5%, a drum thickener is the preferred fine solids separation device. High consistency drum thickeners with an internal auger can reach 8 to 12% TSS in the outlet. This allows sludge 38 to be thickened to twice the entering concentration. The sludge 38 is then pumped back to the digester 20 using a hopper fed positive displacement pump.

Optionally, a flotation device or drum filter may be followed with a membrane filter. The retentate of the downstream membrane filter is recycled to the digester 20 and the membrane permeate is combined with effluent 36 from the second thickener 34.

The digester 20 is preferably heated to maintain the temperature in a mesophilic or thermophilic range. Heating is done using a recirculating sludge closed loop 42 from the digester 20 into a heat exchanger 40, for example a tube-in-tube or double spiral heat exchanger, and back to the digester 20. The recirculating loop 42 uses a positive displacement pump operated with continuous or intermittent pumping. Temperature control is done on the hot water side of the heat exchanger 40, automatically introducing new hot water by means of a temperature control valve.

Figure 2:
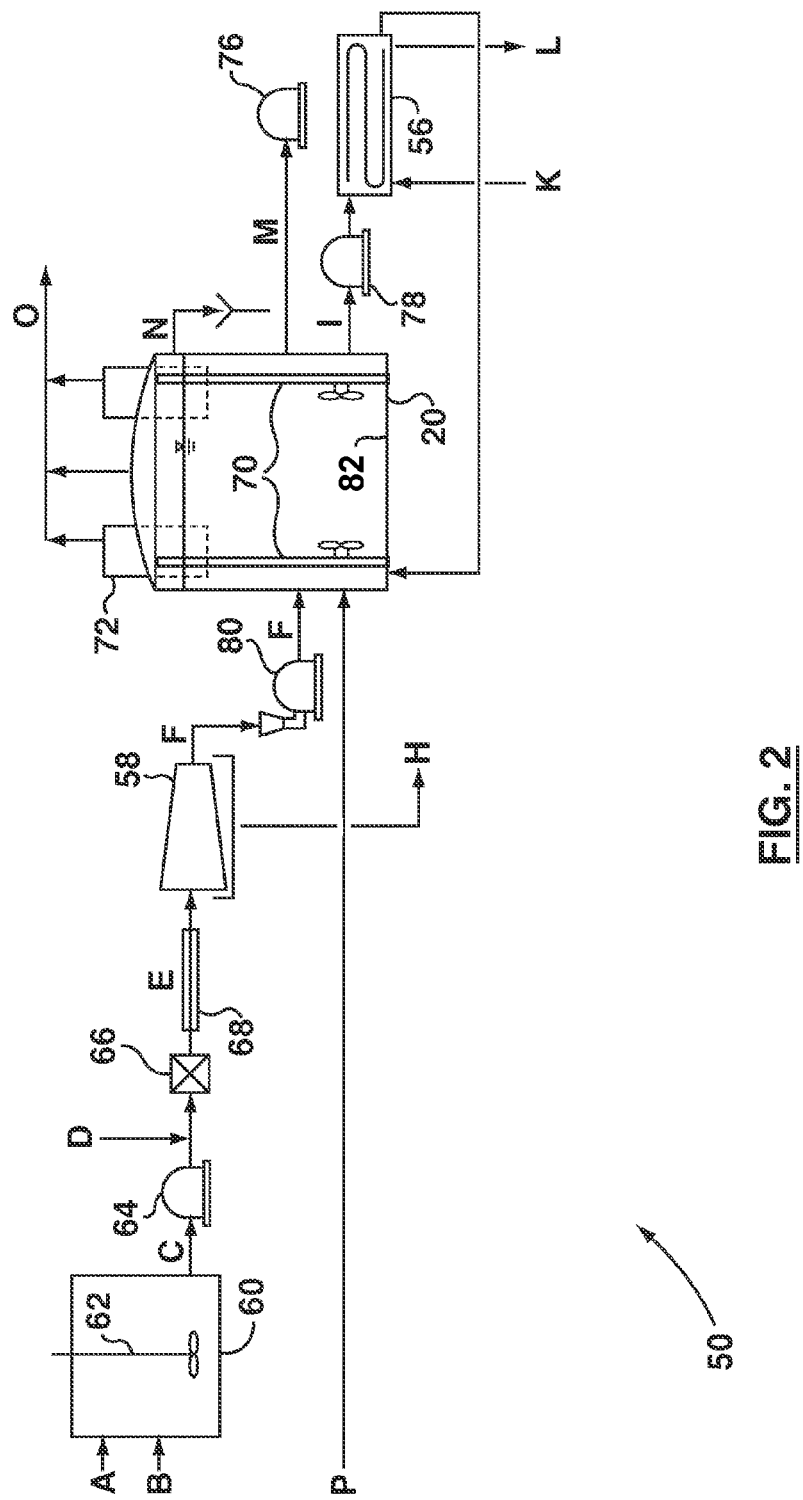
FIG. 2 is a schematic flow sheet of an anaerobic digestion system for use in combination with a wastewater treatment plant with sludge pre-thickening.
Figure 3:
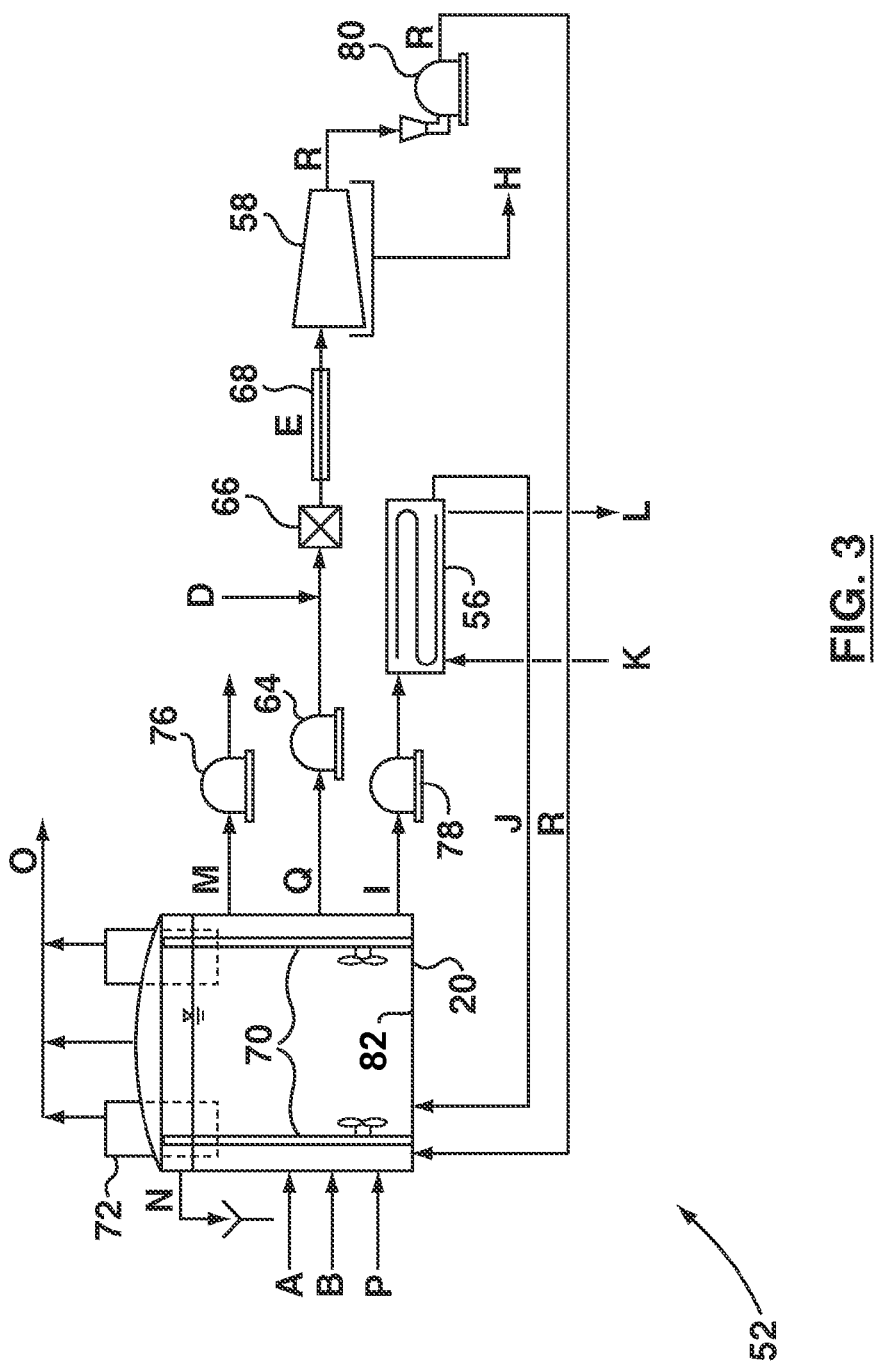
FIG. 3 is a schematic flow sheet of an anaerobic digestion system for use in combination with a wastewater treatment plant with recuperative sludge thickening.

In FIGS. 2 and 3, anaerobic digestion systems 50, 52 are retrofit to a waste sludge digester located in a municipal wastewater treatment plant (WWTP). The systems 50, 52 increase the capacity of the existing digester by operating at a higher solids content than conventional high rate municipal sludge digesters. In most cases, a WWTP has one or more existing digesters that could be converted to higher solids operation with the addition of equipment and process modifications to be described below, without building new tanks or adding volume to existing digester tanks. Alternatively, the systems 50, 52 may be constructed new for use with a WWTP or as free-standing systems to treat sludges or other waste streams.

FIGS. 2 and 3 show schematic process diagrams of systems 50, 52 having digesters with pre-thickening and recuperative thickening, respectively. The systems 50, 52 have been retrofit into the sludge digestion part of a municipal sewage wastewater treatment plant (WWTP). The main process train, comprising for example a primary clarifier, process tanks and a secondary clarifier, are generally unchanged and not shown in FIGS. 2 and 3.

Referring to FIG. 2, primary sludge A and waste activated sludge (WAS) B from the WWTP are pumped to a sludge holding tank 60. The sludges A, B are mixed by holding tank mixer 62 such as a mechanical or pumped jet mixer. Flow of the sludges A, B is also equalized in the holding tank 60. Combined sludge C is taken from the holding tank 60 by a positive displacement sludge feed pump 64. A dilute polymer D is added to the combined sludge C before it passes through a shear valve or static mixer 66. The sludge and polymer blend E then passes through a pipe length 68 to allow for flocculation.

The combined sludge C with flocculated solids is thickened in a rotary drum or screw thickener 58. Filtrate H removed from the solids is returned to the head works of the WWTP. Thickened sludge F is feed to a transfer pump 80, such as a hopper fed positive displacement pump, to be pumped to an existing anaerobic sludge digester tank 82. Additional external, typically high strength, waste P may also be added to the digester 82 for co-digestion from a source other than the WWTP.

Sludge in the digester tank 82 is converted by the biomass in the digester into digestate. The contents of the digester tank 82 are mixed by one or more mixers 70 such as submersible hydraulic mixers. The mixers are accessed through service boxes 72 passing through a lid of the digester tank 82. Digester gas O is withdrawn through the service boxes 72 or the top of the digester tank 82 for treatment and utilization. An emergency overflow N is available to waste digestate to a drain if the digestate level becomes too high.

Digestate to be heated I is pumped through a heating loop with a sludge pump 78, typically a positive displacement pump. The digestate to be heated I passes through a sludge—water heat exchanger 56 to be heated by a flow of heated water. Hot water fed K flows to and through the heat exchanger 56. Hot water return L leaves the heat exchanger at a lower temperate and is sent to a heater for re-heating and re-use. Warm digestate J returns to the digester tank 82. Waste digestate M is withdrawn from the digester tank 82 by a transfer pump 76 and sent for de-watering in de-watering equipment already existing in the WWTP.

System 52 in FIG. 3 uses similar components and streams as system 50 in FIG. 2 as indicated by the use of the same reference numbers and letters. However, in system 52 the primary sludge A, WAS B and any external waste P for co-digestion flow into the digester tank 82 directly. Digestate for recuperative thickening Q is taken from the digester tank 82 and sent to the thickener 58 which is located in a side stream loop that returns to the digester tank 82. Filtrate H is returned to the headworks of the WWTP but may be treated on the way, for example to remove ammonia or phosphorous.

Retrofitting an existing WWTP digester to operate at a higher solids concentration enables a higher volatile solids reduction (VSR) and increased digester gas O generation by extending the solids retention time in the digester tank 82. Additionally, the retrofit allows the WWTP to co-digest external waste P with larger proportions of high strength streams such as fats, oil and grease (FOG), food processing high strength waste streams, or prepared slurries using the organic fraction of municipal, restaurant or grocery waste, or other mixtures.

Conventional high rate municipal WWTP digesters are fed a combination of primary sludge A, usually at 3% solids, and thickened waste activated sludge B at 5% solids. The combination typically has 4% total solids of which 80% is volatile. These existing digesters are typically designed for 20 to 25 days of hydraulic retention time (HRT) and usually achieve 50% to 55% VSR. The solids content of the digestate, which is the content of the digester tank 82, is usually about 2.5% solids. Digestate dynamic viscosity is usually 0.4 to 0.5 Pascal second (Pa·s) or 400 to 500 centipoise (cP) at a shear rate of 20 to 30 over second (1/s) and 38 degrees C. The volatile solids loading rate or organic loading rate (OLR) feeding 4% solids and allowing 20 days HRT is 0.09 lb VS/ft3-day (1.4 kg VS/m3-d).

If a digester with 20 days HRT fed with waste sludge A, B from a WWTP is used for co-digestion, usually no more than an additional 20% of the feed flow, having less than 10% VS content, can be added as grease or other external waste P. Otherwise, the HRT is reduced excessively and the slow growing methanogens exit the digester tank 82 at a rate higher than that at which they reproduce, and this results in digester organic overload and failure. SRT in a conventional CSTR digester without thickening is reduced with the HRT and soon passes below a minimum required for effective digestion of difficult wastes such as grease. However, with thickening a large inventory of anaerobic biomass is maintained in the digester tank 82 and the hydraulic retention time is at least not reduced, and preferably increased. A co-digester with thickening can be operated at OLRs upwards of 0.27 lb VS/ft3-d (4.2 kg VS/m3-d), or three times the OLR of conventional high rate municipal digesters. This also implies that three times the digester gas O will be generated using the same digester tank 82 volume. If no co-digestion is done but the digester is retrofit to operate at a high solids concentration, for example with the solids retention time doubled to 40 days, a VSR of 65% is usually achieved. The combination of increased feed capacity (because reducing HRT does not necessarily reduce SRT) and increased SRT allows a larger amount of co-digestion waste to be fed to a digester with thickening. For example, 30% or more of the VS loading to the digester may come from co-digestion waste, without reducing the amount of waste sludge A, B fed to the digester tank 82 from the WWTP.

Digester operation with a higher solids content can be achieved in two ways. In FIG. 2, the combined primary sludge A and waste activated sludge (WAS) B is pre-thickened to a solids content of 8 to 10% by removing water from the combined sludge C prior to feeding the digester. In FIG. 3, recuperative thickening is used, which consists of thickening the digestate Q to remove water from it, and returning the biomass at a higher solids content with thickened digestate R to the digester tank 82.

Sludge pre-thickening can be done using drum thickeners or centrifuge thickeners with the addition of polymer or flocculants. Sludge pre-thickening results in lower heat demand in the digester but increases the ammonia concentration in the digester tank 82, since the ammonia content is a function of the feed solids concentration. In many cases pre-thickening is more costly to implement in a WWTP retrofit than recuperative thickening. This is because primary sludge A and WAS B are usually pumped intermittently to several digesters, and so the holding tank 60 is necessary to equalize the flows and feed both streams to a common thickener. The viscosity of undigested sludge A, B or C is higher than that of digestate for the same solids content. Therefore if undigested combined sludge C is thickened to 8 or 10% solids, the high viscosity of the thickened sludge F will be make pumping and sludge conveyance to the digester tank 82 difficult using existing sludge piping. With pre-thickening, the hydraulic retention is also not decoupled from the solids retention time. The HRT and SRT are the same, although the decreased feed flow rate extends both the HRT and the SRT for a given digester tank 82 volume. However, when digesters are used to co-digest WWTP sludge A, B with external waste streams P, the external waste P adds water to the digester tank 82 and reduces both HRT and SRT.

Recuperative thickening effectively decouples SRT from HRT by retaining usually more than 95% of the suspended solids that exit with the digestate sent for recuperative thickening Q, and returning the suspended solids at about twice the solids concentration with thickened digestate R. This can be done by installing an individual recuperative drum or centrifuge thickener 58 for each digester, or a common thickener 58 for a group of digesters, and using polymer. Recuperative thickening results in higher digester heat demand as the water that is extracted is heated in the digester tank 82, although some heat recovery from the filtrate H may be possible. Recuperative thickening also decreases digester alkalinity. However, recuperative thickening reduces ammonia concentration in the digestate relative to pre-thickening, which is beneficial since excessive ammonia can inhibit digestion.

A digester operating with 5 or 6% solids (DS) will require recuperative thickening of its effluent to 10 or 12% solids. The viscosity of the thickened digestate R returning to the digester tank 82 is considerably lower than that of undigested sludge A, B, C at the same solids content. This results in easier pumping using existing pipes. Recuperative thickening is preferred for WWTP retrofits.

In both thickening scenarios, positive displacement pumps 64 are used to handle thickened digestate R or thickened sludge F, and to circulate the digestate I for heating through the heat exchanger 56, due to the viscosity increase (relative to a conventional WWTP digester) resulting from having sludge and digestate at a higher solids concentration. Digester mixing in the digester tank 82 is also affected by the increase in solids content and viscosity in the digestate. An increase in solids content from 2.5% to 5% will usually result in a tenfold increase in viscosity. Digesters operated at 5 to 6% solids content have viscosities of 5 to 7 Pa·s (5,000 to 7,000 cP). Digestate with this viscosity cannot be properly mixed with pumping and jets or gas injection. Due to the high viscosity of the digestate and the operating temperature (38 deg C. if mesophilic or 55 deg C. if thermophilic), electric submersible mixers are not adequate, as the electric motor tends to overheat. Installing electrical equipment inside a digester tank 82 may also create risks of explosion associated with biogas in the headspace. High torque, low speed submersible mixers 70 are required. UTS Products GmbH in Lippetal, Germany manufactures high solids content submersible mixers 70 driven by a hydraulic motor. These mixers 70 are controller through the service boxes 72, which have a retractable skirt designed to isolate the service box 72 from the digester tank 82 headspace. This allows safe mixer servicing without the need to empty the digester tank 82 or stop operation. The service boxes 72 are installed on the digester cover, one on top of each mixer column guide, to access the mixers 70 for service and to enable repositioning or removal of the mixers 70 without digester gas O in the headspace escaping. Fixed digester covers are preferred for positioning the service boxes 72. If a digester tank 82 has floating covers, these can be converted to fixed covers, or replaced with double membrane covers, which are also suitable for installing service boxes 72 and submersible mixers 70.

Each mixer 70 uses a 22 kW external hydraulic power unit and circulates biodegradable hydraulic oil, such that if leaks occur inside the digester then the bacteria can degrade the non-toxic leaked oil. Usually two or more mixers 70 are needed per digester tank 82, depending on the digester tank 82 dimensions. The mixers 70 are located near the tank perimeter and directed to create a rotational movement of the digestate and also to reintroduce floating layers or crusts back into the bulk of the digestate. The UTS hydraulic mixers 70 and service boxes 72, although marketed primarily for agricultural and industrial digesters, are ideally suited for this type of retrofit.

Mixing is done intermittently, usually 20% of the time. Typical mixing intervals are 10 minutes ON and 40 minutes OFF, although other cycles can be used. When co-digesting high solids food waste with municipal sludge, continuous mixing is counterproductive at high loading rates. Continuous mixing is not only unnecessary and more energy consuming, but actually reduces digester performance. Propionate, a volatile fatty acid, tends to accumulate in highly loaded digesters that are continuously and vigorously mixed, but is rapidly consumed under lower intensity intermittent mixing conditions. Propionate inhibition with constant mixing occurs in both mesophilic and thermophilic digesters.

The UTS hydraulic power units have the ability to drive up to 5 mixers 70. The mixers 70 have automatic rotation reversal if a sudden torque increase is detected, which could be attributed to rags or an accumulation of hair or other fibers in the mixer blades. This is known as ragging. The vertical supporting columns of the mixers 70 allow flexibility in directing and positioning the mixers 70 so that the mixing energy can be effectively used.

The preferred recuperative thickening equipment is an enclosed rotary screw thickener 58 with an internal screw, which is designed to thicken sludge with a high initial solids content (3 to 6%). This is in contrast with rotary screen thickeners that do not have an internal screw and are typically used to thicken WAS (initially at about 1% solids). Screw thickeners are available from a few manufacturers. For pre-thickening, conventional rotary drum screens can be used, as offered by many vendors and typically designed to thicken WAS. These units do not have an internal rotating screw. A screen drum rotates with internal welded flights moving the sludge forward as it drains. This type of thickener can be used for combined sludge C pre-thickening prior to feeding the digester, and some commercially available models can take the solids content to 8 or 10% starting at under 2% DS in the combined sludge C. Although rotary drum thickeners 58 may be used for recuperative thickening also, they are less efficient than rotary screw thickeners 58. Enclosed thickeners 58 are preferred for odor control, as ammonia and hydrogen sulfide would otherwise escape to the atmosphere. Thickening centrifuges can also be used, but these are more costly and require more energy to operate.

In recuperative thickening, a positive displacement pump 64 pumps from the digester tank 82 to the thickener 58. An in-line grinder can be installed in the pipe feeding the thickener 58 in cases where municipal sludge is co-digested with waste streams that contain fibers or large pieces. Dilute polymer D is injected upstream of the thickener 58 and a high shear static mixer or mixing valve 66 is used to disperse the polymer D into the digestate Q. Flocculation is done in the pipe 68 as the digestate Q and polymer D approach the thickener 58. Typical polymer doses range from 4 to 6 kg per ton of solids. The thickener 58 removes water and usually achieves 90 to 95% suspended solids recovery. The effluent filtrate H, with suspended solids in the 800 to 3,000 mg/L range, may be directed to the WWTP headworks for treatment in the main liquid train.

When the combined sludge C is pre-thickened, the filtrate H does not contain additional ammonia. In recuperative thickening, the filtrate H contains ammonia as a result of the organic nitrogen mineralized to ammonia in the digestion process. With thickening, an increase in nitrogen loading to the WWTP plant liquid train compared to conventional digestion is usually proportional to the increase in VSR, and may be further increased by co-digestion. The higher the VSR, the more organic nitrogen is converted to soluble ammonia. In conventional sludge digestion, and with both pre-thickening and recuperative thickening, ammonia returns to the WWTP in the filtrate or centrate from waste digestate M dewatering. With pre-thickening, the amount of ammonia returning with the filtrate or centrate from waste digestate M dewatering is increased relative to a convention WWTP digester. When recuperative thickening is used, a portion of the total ammonia returned to the WWTP is carried with the thickener effluent H and the rest with the waste digestate M dewatering filtrate or centrate. Wastewater treatment plants that do not have the capacity to treat the additional ammonia in the filtrate H from recuperative thickening, or digestate M de-watering effluent with pre-thickening, can use supplementary treatments to remove or convert ammonia prior to returning the filtrate H or digestate M de-watering effluent to the main WWTP liquid train.

The thickened sludge F, R at 10 to 12% solids may drop from the thicker 58 into a hopper-fed positive displacement pump 80 such as rotary lobe or progressive cavity pump. The displacement pump 80 sends solids with the thickened sludge F, R to the digester tank 82. The digestion process results in an accumulation of non digestible volatile solids, inert solids, and biomass growing in the digester tank 82. These solids must be removed at a rate required to maintain the desired solids retention time. Waste digestate M is preferably taken directly from the digester tank 82 as there is normally existing piping, and it is easier to pump 5% solids digestate than 10% thickened sludge F, R if it was to be wasted as from the outlet of the thickener 58. Waste digestate M goes to dewatering with existing dewatering equipment in the WWTP.

Due to the increased viscosity in the digestate, modifications to existing digester heating equipment in the WWTP are usually necessary. External tube-in-tube or double spiral heat exchangers 56 may be used. Tube-in-tube exchangers require large passages to reduce head losses and facilitate cleaning, and also require internal static flow deflectors in the sludge side to promote sludge turbulence and increase heat transfer efficiency. This type of tube-in-tube exchanger is available from a few manufacturers and are preferred over spiral exchangers, which usually are more costly and have higher friction losses. Hot water K from a boiler or waste heat from a biogas engine generator may be used to heat the sludge. Sludge is heated in a recirculation loop I, J moved by a positive displacement pump 78 with an in line grinder to reduce the risk of a heat exchanger 56 plugging with rags or fibers. The digestate is usually pumped continuously through the heat exchanger 56 and hot water K, L is pumped through the exchanger 56 as needed to maintain the desired temperature. This is done automatically with a temperature control valve.

Unless stated otherwise or apparent form the context, solids contents or concentrations mentioned above are dried solids (DS) measurements which would be the same as a total solids (TS) measurement. In digestate, the DS is roughly 10% higher than total suspended solids (TSS) and the total dissolved solids (TDS) is typically 2500 to 4000 mg/L (0.25 to 0.4%). For example, a 5% DS digestate may have 46,000 mg/L of TSS and 4000 mg/L TDS. Accordingly, solids contents or concentrations, unless specified otherwise, can generally be interpreted as TSS without causing a material difference in the process.

The descriptions of processes and apparatus above are to provide at least one example of an embodiment within each claim but not to limit or define any claim. However, multiple processes and apparatus have been described above and it is possible that a particular process or apparatus described above is not within a specific claim. Process parameters are given as examples of how a plant may be operated and are not meant to limit a claim unless explicitly recited in a claim. Other processes for similar applications might operate at parameters within ranges that are 50% or 100% larger in both directions than the parameter ranges described above, or within a 50% or 100% variation from a single parameter described above. If one or more elements or steps described above are used to treat other wastes or under other conditions, then one or more process ranges described above might not be suitable and would be substituted with other appropriate parameters. Various sub sets of the unit processes described in relation to plant 100 can be used in other treatment plants. Various sub sets of unit processes in the treatment plants described above may also be combined in ways other than those described to produce different treatment plants. The description of one process or apparatus may be useful in understanding another process or apparatus. Words such as "may", "preferable" or "typical", or variations of them in the description above, indicate that a process step or apparatus element is possible, preferable or typical, according to the word used, but still optional and not necessarily part of any claimed invention unless explicitly included in a claim.

We claim:

1. A process for treating waste sludge from a wastewater treatment plant comprising the steps of,
   a) flowing the waste sludge to an anaerobic digester;
   b) thickening the waste sludge before it enters the digester or recuperative thickening of digestate in the digester; and,
   c) adding an external waste stream to the digester such that at least 30% of the volatile solids loading to the digester is derived from the external waste stream.

2. The process of claim 1 wherein digestate in the digester is mixed with hydraulic mixers.

3. The process of claim 1 wherein the digester is mixed intermittently.

4. The process of claim 1 comprising recuperative thickening of the digestate.

5. The process of claim 4 comprising grinding digestate before flowing the digestate to a thickener in a recuperative thickening loop.

6. The process of claim 1 comprising wasting digestate directly from the digester.

7. The process of claim 1 wherein digestate in the digester is maintained at a solids content of 3% or more.

8. The process of claim 1 wherein digestate in the digester is maintained at a solids content of 5% or more.

9. A process for treating waste sludge from a wastewater treatment plant comprising the steps of,
   a) flowing the waste sludge to an existing anaerobic digester of the wastewater treatment plant; and,
   b) recuperative thickening digestate in the digester.
   wherein diqestate in the digester is maintained at a solids content of 5% or more, and further comprising adding an external waste stream to the digester such that at least 30% of the volatile solids loading to the digester is derived from the external waste stream.

10. The process of claim 9 wherein the step of recuperative thickening comprises thickening digestate in a rotary screw press.

11. The process of claim 9 comprising mixing digestate in the digester with a hydraulic mixer.

12. A process for treating waste sludge from a wastewater treatment plant comprising the steps of,
   a) flowing the waste sludge to an existing anaerobic digester of the wastewater treatment plant; and,
   b) recuperative thickening digestate in the digester,
   wherein digestate in the digester is maintained at a solids content of 5% or more, and further comprising mixing digestate in the digester intermittently.

13. The process of claim 12 wherein the step of recuperative thickening comprises thickening digestate in a rotary screw press.

14. The process of claim 12 comprising mixing digestate in the digester intermittently.

* * * * *